(12) United States Patent
Marioni

(10) Patent No.: US 9,475,542 B2
(45) Date of Patent: Oct. 25, 2016

(54) BRAKE FOR ELECTRIC BICYCLE

(71) Applicant: ASKOLL EVA S.R.L., Povolaro di Dueville (Vicenza) (IT)

(72) Inventor: Elio Marioni, Dueville (IT)

(73) Assignee: Askoll Eva S.r.l. (IT)

( * ) Notice: Subject to any disclaimer, the term of this patent is extended or adjusted under 35 U.S.C. 154(b) by 0 days.

(21) Appl. No.: 14/632,563

(22) Filed: Feb. 26, 2015

(65) Prior Publication Data

US 2015/0266539 A1  Sep. 24, 2015

(30) Foreign Application Priority Data

Mar. 18, 2014 (EP) .................................. 14425030

(51) Int. Cl.
*B62L 3/02* (2006.01)
*B62M 6/50* (2010.01)

(52) U.S. Cl.
CPC . *B62L 3/02* (2013.01); *B62M 6/50* (2013.01); *Y10T 477/24* (2015.01); *Y10T 477/30* (2015.01); *Y10T 477/37* (2015.01)

(58) Field of Classification Search
CPC . Y10T 477/30; Y10T 477/24; Y10T 477/37; B62L 3/02; G62M 6/50
See application file for complete search history.

(56) References Cited

U.S. PATENT DOCUMENTS

| | | | |
|---|---|---|---|
| 4,914,971 A | 4/1990 | Hinkens et al. | |
| 5,674,142 A * | 10/1997 | Jordan | B62K 23/00 474/80 |
| 5,845,539 A | 12/1998 | Huang | |
| 5,946,978 A * | 9/1999 | Yamashita | B62K 23/06 188/24.11 |
| 6,142,281 A * | 11/2000 | Campagnolo | B62K 23/06 192/217 |
| 6,328,138 B1 * | 12/2001 | Takizawa | B62L 3/00 188/24.11 |
| 2010/0236350 A1 * | 9/2010 | Tsai | B60T 7/102 74/480 R |
| 2010/0252345 A1 * | 10/2010 | Hoshino | B60L 7/18 180/65.31 |
| 2011/0048161 A1 * | 3/2011 | Shipman | F16C 1/16 74/502.2 |
| 2013/0228405 A1 * | 9/2013 | Tsai | B62L 3/02 188/344 |
| 2013/0228406 A1 | 9/2013 | Tsai | |
| 2014/0053675 A1 * | 2/2014 | Tetsuka | B62M 25/08 74/473.13 |
| 2015/0354621 A1 * | 12/2015 | Bisarello | F16C 1/223 74/502.6 |

FOREIGN PATENT DOCUMENTS

| | | |
|---|---|---|
| CN | 2 349 118 Y | 11/1999 |
| CN | 1 955 062 A | 5/2007 |
| CN | 200 981 621 Y | 11/2007 |
| CN | 201 128 471 Y | 10/2008 |
| CN | 102 398 663 A | 4/2012 |

(Continued)

OTHER PUBLICATIONS

English transaltion of DE102011001095A1; http://translationportal.epo.org; Apr. 12, 2016.*

(Continued)

*Primary Examiner* — Roger Pang
(74) *Attorney, Agent, or Firm* — Akerman LLP

(57) ABSTRACT

A brake for an electric bicycle is described, said brake comprising at least one mounting block (21) including a brake lever bracket (13) and a brake lever (5). Suitably, the brake comprises an internal support-piece (17) in turn comprising at least one first hole (17A) for housing a brake cable (11) connected to a suitable braking apparatus and a seating portion (17B) for seating a sensor cable (19) connecting a braking sensor (19A) to an electric motor of said electric bicycle.

9 Claims, 8 Drawing Sheets

(56) References Cited

FOREIGN PATENT DOCUMENTS

| CN | 203 158 178 U | 8/2013 | |
|---|---|---|---|
| DE | 102011001095 A1 * | 10/2011 | ............... B60T 1/10 |
| EP | 0 059 067 A1 | 9/1982 | |
| EP | 1 808 367 A2 | 7/2007 | |
| EP | 2 275 338 A1 | 1/2011 | |
| WO | 2007/082420 A1 | 7/2007 | |

OTHER PUBLICATIONS

European Search Report issued in connection with EP 14 42 5030.

* cited by examiner

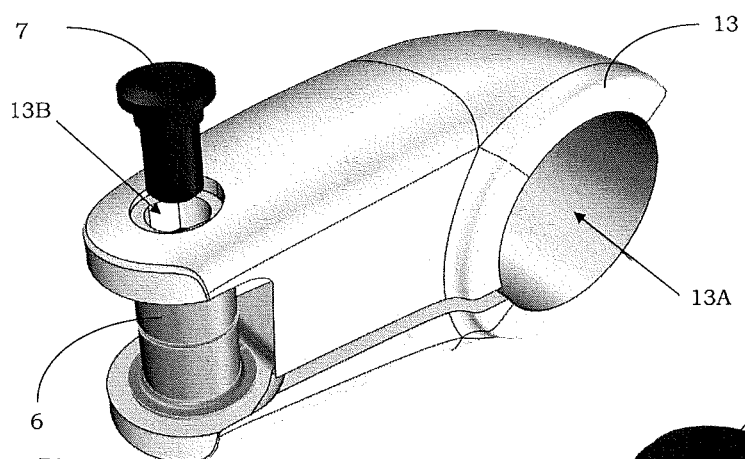
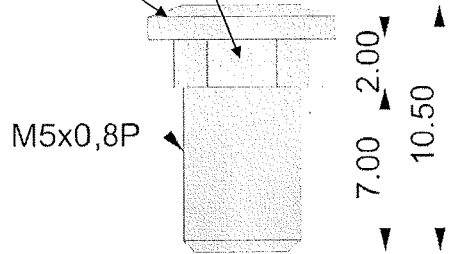
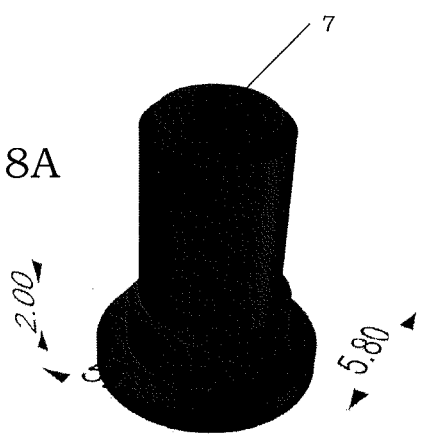
FIG. 8A
FIG. 8B
FIG. 8C

BRAKE FOR ELECTRIC BICYCLE

CROSS-REFERENCE TO RELATED APPLICATIONS

The present application claims priority to European Patent Application No. 14425030.5, filed Mar. 18, 2014, the entirety of which is incorporated herein by reference.

FIELD OF APPLICATION

The present invention relates to a brake for an electric bicycle.

PRIOR ART

As is well known, for some years now, following an increase in environmental awareness, so-called "zero emission vehicles" (ZEV) have become more widespread. These vehicles in fact are characterized by the fact that they release practically zero polluting emissions into the atmosphere.

In particular the most common zero emission vehicles are electrically propelled transportation means or electric vehicles.

The characteristic feature of the electric vehicles is that have an electric motor which uses as energy source the energy stored in one or more rechargeable batteries and supplied by these to the motor in the form of electric power. Generally speaking, the most common vehicles propelled solely by electric energy are small town cars, bicycles, scooters, golf buggies and forklift trucks which require a small amount of power.

A major drawback of these types of vehicles consists in the limited autonomy of the batteries.

Electric vehicles of a certain size, such as motor cars, are therefore still less attractive compared to the fuel-driven cars which are currently in circulation, since the energy which can be obtained from the combustion of a few dozen liters of fuel contained in the tank greatly exceeds that which can be stored by a series of batteries weighing as much as several hundred kg, even considering the latest lithium ion batteries, these electric vehicles being able to travel only a small number of kilometers.

It is also known that the use of electric vehicles gives rise to various advantages for the user/proprietor of such vehicles, including:
- a drastic reduction in the vehicle management and maintenance costs;
- a major reduction in the insurance and road tax costs; and
- the possibility for free access to and travel within so-called limited traffic zones (LTZ) as well as parking advantages and the use of preferential travel lanes.

In addition to these "personal" benefits there are also many economic and environmental benefits for the entire community, including the following:
- reduction in the use of petroleum;
- slowing down of the global warming and environmental pollution, especially if the energy of the vehicle itself is derived from renewable energy sources;
- reduction in noise pollution, it being well-known that electric motors are more silent than internal-combustion engines;
- the total absence of harmful fumes; and
- reduction in the costs and risks associated with the transportation of fuel: electric energy transportation, in addition to being safer, is in fact very much easier than transportation of fuels by pipelines or tankers.

Considering all the electric vehicles, the ones which are least affected by the drawbacks associated with the use of batteries and therefore the autonomy are bicycles since they are used over short distances, have a low weight and require a small amount of power.

It is emphasized that in electric bicycles an electric motor is normally used as an aid and not as a substitute for the pedalling action.

Such bicycles are referred to more correctly as "electric pedal-assisted cycles (EPAC), or also "pedelecs", i.e. bicycles where the human propulsive action is combined with that of an electric motor. The term "e-bike" is also commonly used, although it is broader in meaning since it includes also bicycles in which the motor operates independently of the pedalling action.

A pedal-assisted bicycle is very silent since it does not have any polluting emissions and ensures several tens of kilometers of autonomy with the assistance of the motor, and even more than 150 km in the case of the more sophisticated models, in particular those with lithium batteries, where the work distribution between motor and cyclist is variable and often can be selected by the cyclist itself.

The European directive 2002/24/CE (Article 1, para. h), which has also been enforced in Italy, defines the pedal-assisted bicycle as a bicycle equipped with an auxiliary electric motor and having the following characteristics:
- continuous maximum nominal power of the electric motor: 0.25 kW
- power output of the motor which is gradually reduced and then interrupted when a speed of 25 km/h is reached; and
- power output of the motor which is interrupted before the speed of 25 km/h is reached, when the cyclist stops pedalling.

Vehicles which comply with this directive do not require type-approval and are classified for all intents and purposes as conventional bicycles.

In order to comply with the legal requirements, an electric bicycle must therefore also comprise at least one pedalling sensor which is connected, usually via a control unit, to a motor ignition block.

More particularly, the pedalling sensor should inform the control unit whether pedalling is actually being performed; only in this case, in fact, may the motor be activated, according to the current legislation. Basically two types of sensors exist: sensors which detect the simple rotation of the pedals and sensors which detect the force actually exerted by the cyclist on the pedals.

The sensors which detect rotation of the pedals are generally formed by magnets which, with each rotation of the pedal, activate a sensor fixed on the bicycle frame; these magnetic sensors are low cost, but result in a certain time-lag initially (since it is necessary to wait for a sufficient number of magnets to have passed in front of the sensor).

The force-detection sensors may be of various types, but basically they are configured so as to indirectly estimate the power exerted by the cyclist on the pedals; these force sensors are usually more costly, but allow a more natural pedalling action since they are usually more reactive.

Moreover, as in a conventional bicycle, an electric bicycle also comprises a brake which must be suitably connected also to the motor so as to deactivate it when braking occurs.

Finally, it is usual to equip an electric bicycle with at least one indicator for indicating the charged state of the battery.

Hitherto, for the consumer, the main obstacle to acquiring an electric bicycle is the purchase price; this is therefore the main factor which prevents the widespread distribution of electric bicycles and substantially limits the number of potential users.

A factor which is likewise an obstacle to the spread of electric bicycles is their typical bulkiness and awkward handling, mainly due to the positioning of the motors and the batteries and in general their appearance, which is somewhat different from that of conventional non-motorized bicycles.

All the connections necessary between batteries and motors, as well as between brakes and sensors, are also complicated and unaesthetic.

The technical problem of the present invention is that of providing a brake for an electric bicycle which has structural and functional characteristics such as to overcome the limitations and drawbacks which still affect the brakes produced according to the prior art, in particular having a configuration which is particularly compact, safe and aesthetically appealing, without an excessive increase in costs for the production thereof.

SUMMARY OF THE INVENTION

The idea of solution at the basis of the present invention is that of designing a brake with an external lever, in an inverted configuration compared to conventional bicycle brakes, and with a body formed so as to accommodate, in addition to the conventional cable for operating the wheel braking block, also the cable connecting the brake and motor, as well as a system for adjusting the length of this cable, the brake body being inserted inside a suitable sleeve and connected to a frame of the bicycle, wherein this connection cable is extended along the frame as far as a motor and/or a motor control unit.

Based on this proposed solution the technical problem is solved by a brake for an electric bicycle, comprising at least one mounting block including a brake lever bracket and a brake lever, characterized in that it comprises an internal support-piece in turn comprising at least one first hole for housing a brake cable connected to a suitable braking apparatus and a seating portion for seating a sensor cable connecting a braking sensor to an electric motor of said electric bicycle.

More particularly, the invention comprises the following additional and optional features, taken individually or in combination, if needed.

According to one aspect of the invention, the seating portion of the internal support-piece may be a portion having a smaller diameter than the remainder of the body of the internal support-piece and the sensor cable may be would around the seating portion.

According to another aspect of the invention, the braking sensor may protrude from a first opening of the internal support-piece and is connected to a portion of the sensor cable seated inside a suitable groove which leads into the seating portion of the internal support-piece.

Furthermore, the internal support-piece may be able to be housed inside a receiving sleeve connected to a frame of the electric bicycle.

According to another aspect of the invention, the electric bicycle brake may further comprise a cable length adjuster associated with the internal support-piece.

Furthermore, the cable length adjuster may be form coupled with a cable length adjusting screw provided with a regulating compression spring and be housed inside a first hole in the brake lever bracket, this cable length adjuster being able to displace the position of a brake sheath with respect to the brake cable.

According to a further aspect of the invention, the cable length adjuster may comprise a knurled peripheral portion accessible on the outside of the brake lever bracket.

According to yet another aspect of the invention, the brake lever may comprise at least one first seat for housing a rotational bush in turn associated with a return spring kept in position by a first sliding sleeve closed by a lever pivot screw and a second sliding sleeve closed by a keyed screw, this rotational bush being the structural pivot on which the brake lever rotates and having the function of a thrust bearing for the brake lever bracket.

This rotational bush may have both its end threaded and have a hexagonal profile in an internal central part such that it may be fixed to the keyed screw.

Finally, according to another aspect of the invention, the brake lever comprises a second seat able to receive a magnet, this magnet being glued therein.

The characteristic features and advantages of the brake for an electric bicycle according to the invention will emerge from the description, provided hereinbelow, of a non-limiting example of embodiment thereof with reference to the accompanying drawings.

BRIEF DESCRIPTION OF THE DRAWINGS

In these drawings:

FIG. 8A shows in a schematic form an exploded view of a further detail of the brake according to FIG. 1A; and FIGS. 8B and 8C show in a schematic form perspective views of a component of the further detail according to FIG. 8A.

DETAILED DESCRIPTION

With reference to these figures, 20 indicates globally and in a schematic form a brake for an electric bicycle designed in accordance with the invention.

It should be pointed out that the figures show schematic views of the brake according to the invention and are not drawn to scale, but are instead drawn so as to emphasize the main characteristic features of the invention.

Moreover, in the figures the various parts are shown in a schematic form and their form may vary depending on the desired application.

Figure 1A:
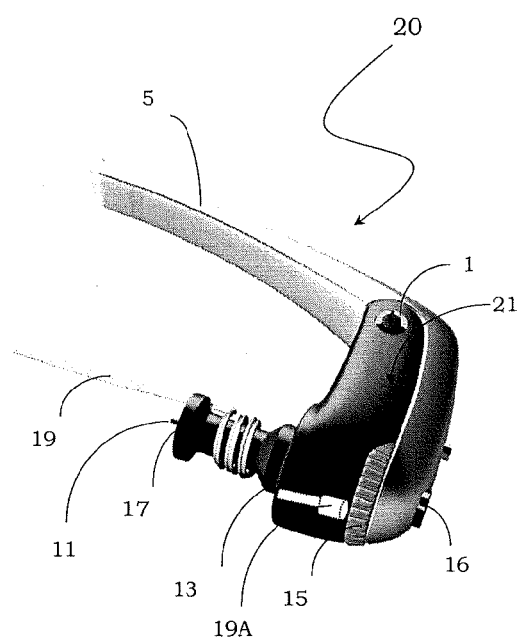
FIGS. 1A and 1B show respective schematic perspective views of the brake according to the present invention in two different assembled conditions.

With particular reference to FIG. 1A, the brake 20 essentially comprises a mounting block 21 associated with a brake lever 5 by means of a lever pivot screw 1.

The mounting block 21 comprises in particular at least one brake lever bracket 13 associated with an internal support-piece 17 which takes the form of a cartridge-type insert.

Advantageously, according to the invention, the internal support-piece 17 is configured to house a brake cable 11 and also a sensor cable 19.

More particularly, the brake cable 11 is able to provide a mechanical and electrical connection between a suitable braking apparatus (not shown), such as a disc brake, and the brake lever 5, and therefore the braking commands imparted by a user of an electric bicycle (also not shown) in which the brake 20 is mounted.

Similarly, the sensor cable 19 is able to connect a braking sensor 19A associated with the mounting block 21 of the brake 20 to an electric motor (not shown) of such a bicycle, if necessary via a control unit associated with the motor.

Suitably, as will be clarified in the description below, the internal support-piece 17 is also provided with a cable length adjuster 15 having a at least one cable length adjusting screw 16.

Figure 1B:
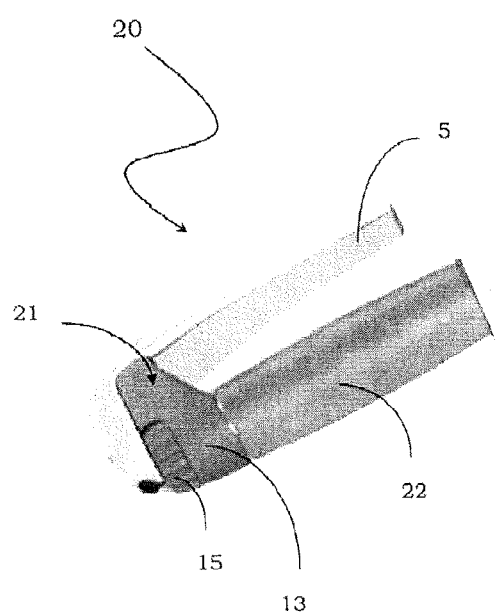

Moreover, advantageously according to the invention, the internal support-piece 17 is housed inside a receiving sleeve 22 connected to a frame of the electric bicycle on which the brake 20 is mounted, as shown in FIG. 1B, this frame being suitable for seating the brake cable 11 and the sensor cable 19 and for extending them as far the braking apparatus and the electric motor, respectively.

It is therefore immediately clear that the brake 20, once mounted on the electric bicycle, allows a connection to the braking apparatus and the electric motor without the use of external cables which, it is known, occupy spare, are unaesthetic and potentially dangerous.

Figure 2:
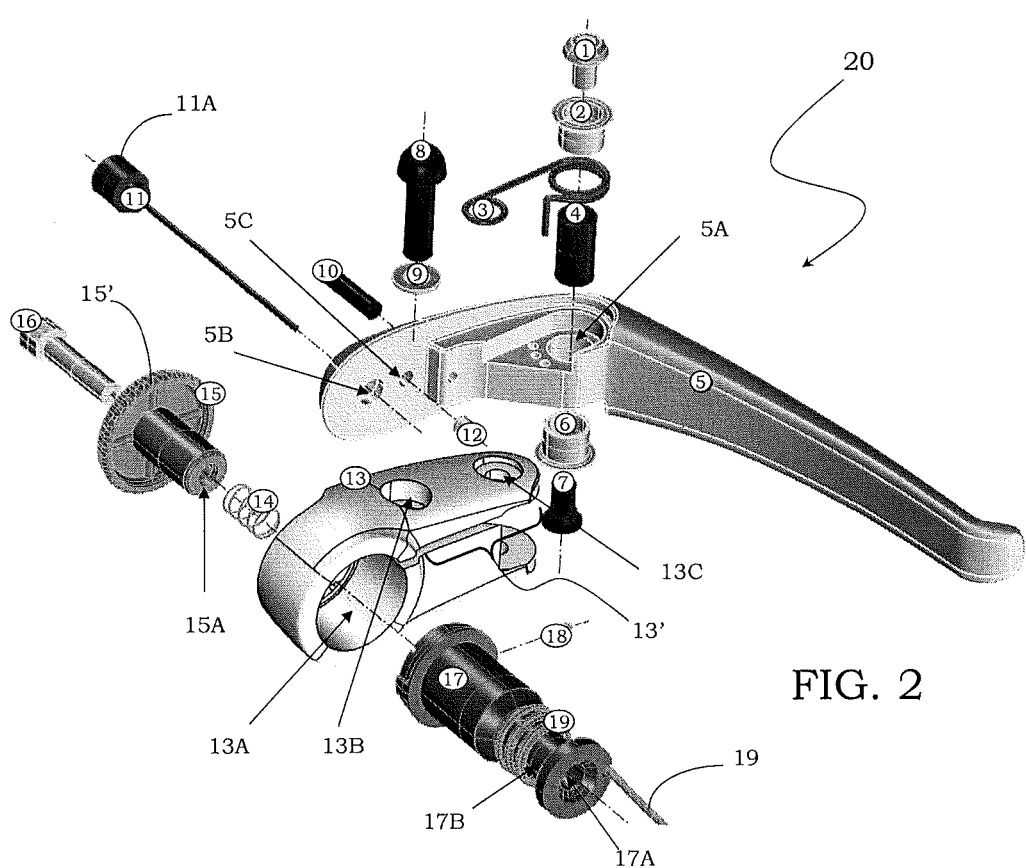
FIG. 2 shows in a schematic form an exploded view of the brake according to FIG. 1A.

More particularly, as shown in FIG. 2, the brake lever 5 comprises at least one first seat 5A, in particular a through-hole which houses inside it a rotational bush 4 in turn associated with a return spring 3 kept in position by a first sliding sleeve 2 closed by the lever pivot screw 1. The rotational bush 4 is also associated with a second sliding sleeve 6 closed by a keyed screw 7 for the lever pivot.

In the assembled condition of the brake 20, as shown in FIG. 1B, the first sliding sleeve 2 and the lever pivot screw 1 are positioned facing the ground, while the second sliding sleeve 6 and the keyed screw 7 for the lever pivot are positioned visible to the user of the electric bicycle.

Furthermore, the brake lever 5 comprises a brake cable through-hole 5B for receiving the brake cable 11 as well as a second seat 5C for receiving a magnet 12.

It is emphasized that the rotational bush 4 is the structural pin on which the brake lever 5 rotates. The rotational bush 4 also has the function of a thrust bearing for the brake lever bracket 13 which, gripped by the fixing screw 8 of the brake lever bracket, would otherwise tend to prevent operation of the brake lever 5.

The first sliding sleeve 2 and the second sliding sleeve 6 allow the rotational bush 4 to move together with the brake lever 5.

Furthermore, the return spring 3 has the function of recalling the brake lever 5 into the rest position (brake open).

The lever pivot screw 1 fixes the rotational bush 4 to the brake lever bracket 13, constraining the brake lever 5 to a fork portion 13' of this bracket.

Similarly, the keyed screw 7 for the lever pivot fixes the rotational bush 4 to the brake lever bracket 13, constraining the brake lever 5 to the fork portion 13'.

It is emphasized that the keying of the screw 7 prevents rotation, and therefore, during the assembly stages, locking of the rotational bush 4 is performed by screwing this keyed lever-pivot screw 7 directly onto it.

The brake lever bracket 13, in addition to supporting the brake lever 5 indeed, incorporates the function of adjusting the length of the brake cable 11 owing to the association, with the internal support-piece 17, of a cable length adjuster 15 connected to a cable length adjusting screw 16 provided with a regulating compression spring 14 housed inside a first hole 13A of the brake lever bracket 13.

Figure 3:
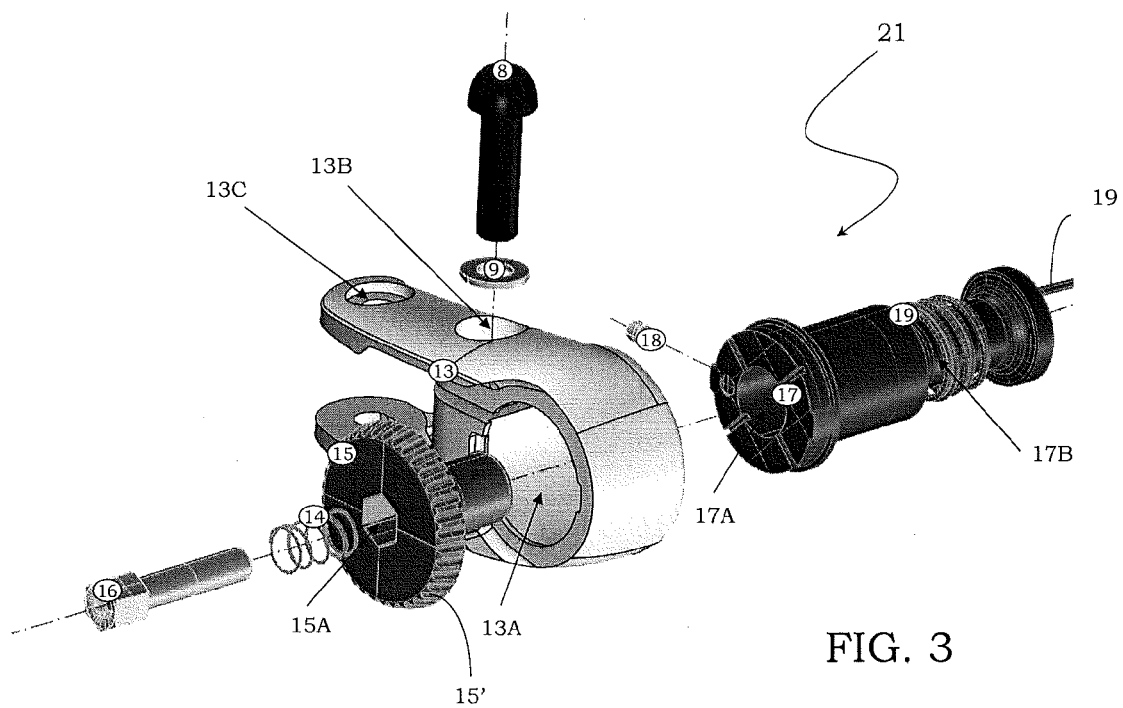
FIG. 3 shows in a schematic form an exploded view of a detail of the brake according to FIG. 1A.

The brake lever bracket 13 also comprises a second hole 13B for receiving a fixing screw 8 associated with a washer 9, as shown also in FIG. 3.

Finally, the brake lever bracket 13 comprises a third hole 13C for receiving the rotational bush 4 and the first and second sliding sleeves 2, 6.

More particularly, the cable length adjuster 15, acting on the cable length adjusting screw 16 by means of a form coupling, displaces the position of a brake sheath 11A with respect to the brake cable 11. In fact, the cable length adjusting screw 16, when screwed onto the internal support-piece 17, presses against a sheath end of the brake sheath 11A and, causing them to slide inside a first hole 17A of the internal support-piece 17, modifies the position thereof.

The cable length adjusting screw 16 also has the function of keeping the cable length adjuster 15 pressed against an end portion of the internal support-piece 17, by means of the regulating compression spring 14.

Moreover, owing to keying of the cable length adjuster 15 and the first hole 17A in the internal support-piece 17, the two parts are joined together in an indexed manner, thus preventing the cable length adjuster 15 from becoming unscrewed.

The cable length adjuster 15 comprises a knurled peripheral portion 15' accessible from the outside of the brake lever bracket 13.

Figure 4A:
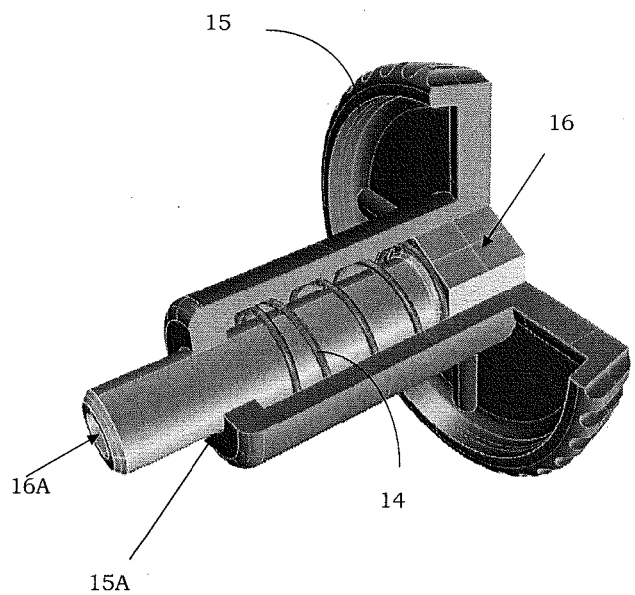
FIGS. 4A and 4B show in a schematic form exploded views of a further detail of the brake according to FIG. 1A.
Figure 4B:
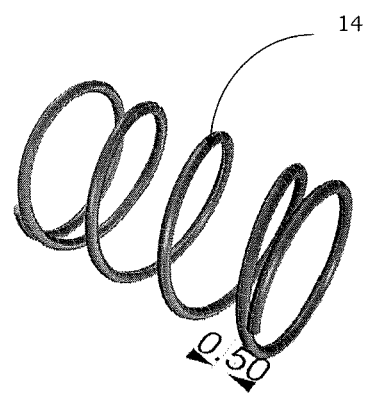

The action of the cable length adjuster 15 on the cable length adjusting screw 16 by means of the regulating compression spring 14 is shown in greater detail in FIG. 4A, FIG. 4B showing the regulating compression spring 14 on its own, this spring being for example formed by means of a steel cable with a nominal diameter of 0.50 mm.

Furthermore, the internal support-piece 17 comprises a seating portion 17B with a smaller diameter than the remainder of the body of the internal support-piece 17 and designed to seat a sensor cable 19 connected to a braking sensor 19A.

More particularly, the braking sensor 19A protrudes from an opening 17C of the internal support-piece 17 and is connected to a portion of the sensor cable 19 seated inside a suitable groove 19B which leads into the seating portion 17B of the internal support-piece 17.

Figure 5A:
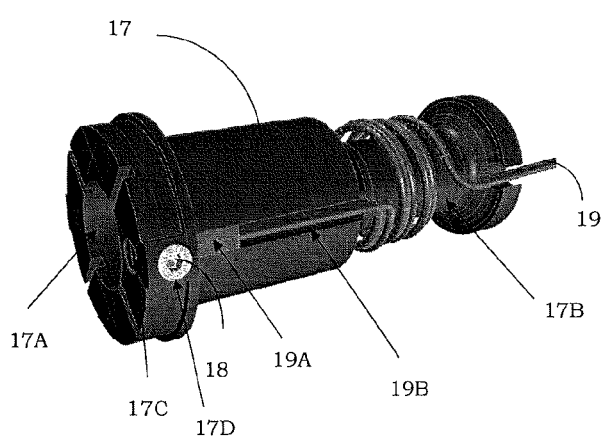
FIG. 5A shows in a schematic form an exploded view of a further detail of the brake according to FIG. 1A.
Figure 5B:
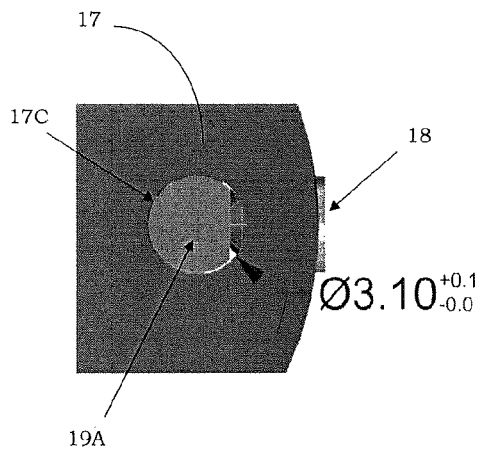
FIG. 5B shows in a schematic form a cross sectional view of the further detail shown FIG. 5A.

In this way, the braking sensor 19A is seated inside the internal support-piece 17 and fixed to it by means of sensor fixing grub-screw 18 housed inside a second hole 17D formed in the internal support-piece 17, as shown in FIGS. 5A and 5B.

It is emphasized that, advantageously according to the invention, since the sensor cable 19 is wound on the internal support-piece 17, along the seating portion 17B, the braking sensor 19A is protected from the risk of being accidentally pulled out.

The sensor fixing grub-screw 18 may also be made of stainless steel with a nominal diameter of 3.10 mm.

Furthermore, as also required by the existing legislation, the brake lever 5 should be able to be adjusted in relation to the hand-grip used. For this purpose, the brake lever 5 is also provided with a screw 10 for adjusting the lever opening, screwing or unscrewing of which results in the movement of the brake lever 5 away from or towards the brake lever bracket 13. This lever-opening adjusting screw 10 may also be made, for example, of stainless steel.

Figures 6A, 6B:
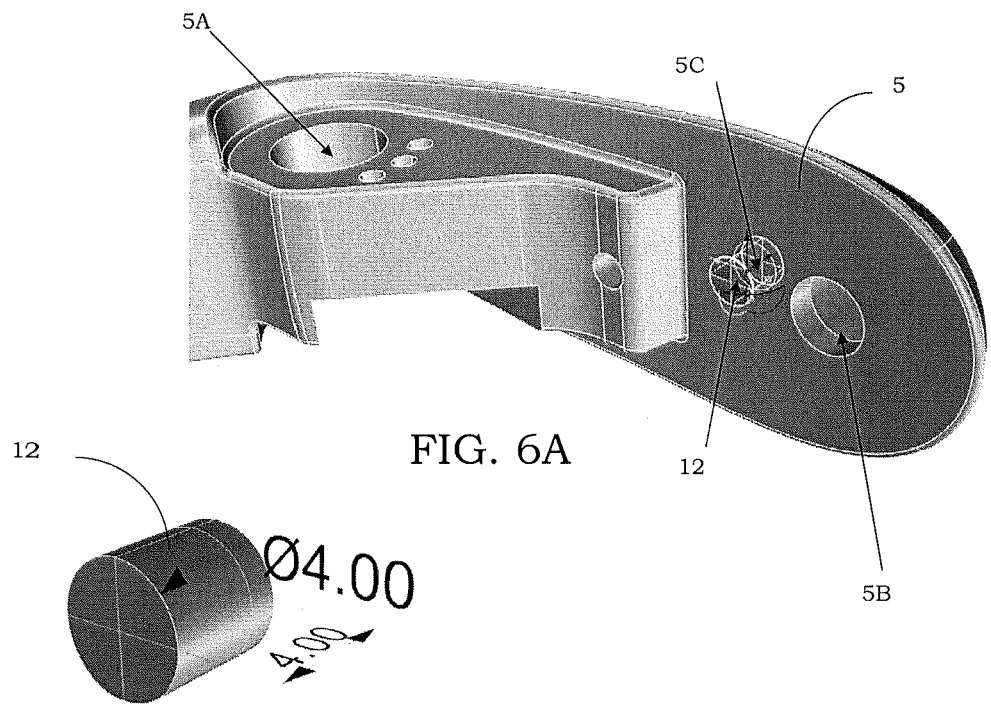
FIG. 6A shows in a schematic form a perspective view of a detail of the brake according to FIG. 1A.
FIG. 6B shows in a schematic form a perspective view of a component of the further detail according to FIG. 6A.

Moreover, as shown in greater detail in FIG. 6A, the brake lever 5 comprises a second seat 5C designed to receive the magnet 12. More particularly, the magnet 12 is glued inside the second seat 5C.

As shown in FIG. 6B, the magnet 12 is usually a cylinder with a nominal diameter of 4 mm.

Figure 7:
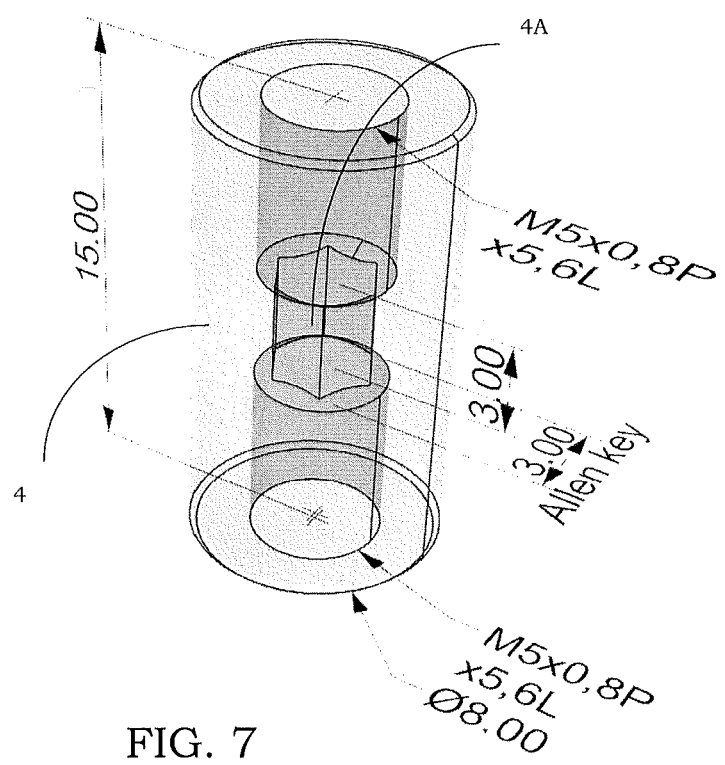
FIG. 7 shows in a schematic form a perspective view of a further detail of the brake according to FIG. 1A.

Finally, it is emphasized that, as shown in FIG. 7, the rotational bush 4 has a hexagonal profile in the internal central part and it is therefore possible, by means of an Allen key, to fix it onto the keyed lever-pivot screw 7, the rotational bush 4 having both its ends threaded.

Advantageously, according to the invention, as shown in FIGS. 8A-8C, the keyed lever-pivot screw 7 also has a special anti-rotation keying, with at least one flat portion 7A on an annular rim adjacent to the head of the screw itself.

It is pointed out that, owing to the keying of the keyed lever-pivot screw 7 for the lever pivot, it is possible to avoid having to provide the aesthetically unattractive hole for receiving an Allen key, which would be necessary for other methods of fixing the rotational bush 4.

It should be remarked that the brake obtained according to the invention is particularly compact and aesthetically attractive, while not involving an excessive increase in the manufacturing costs.

In particular, once mounted on the electric bicycle, it allows a connection to the braking apparatus and the electric motor without the use of external cables which, it is known, occupy spare, are unaesthetic and potentially dangerous.

Moreover, the rotational bush, when inserted in its mounting block, forms not only the structural pin on which the brake lever rotates, but also a thrust bearing for the brake lever bracket, which, gripped by the fixing screw for the brake lever bracket, would otherwise tend to prevent operation of the brake lever.

Furthermore, advantageously according to the invention, the braking sensor used is protected against the risk of being accidentally pulled out, owing to winding of its sensor cable on the internal support-piece 17, along the smaller-diameter seating portion.

Finally, yet advantageously according to the invention, a lever pivot screw with special anti-rotational keying is used, the keying on this screw also avoiding having to provide an aesthetically unattractive hole for receiving an Allen key.

Obviously a person skilled in the art, in order to satisfy any specific requirements which might arise, may make numerous modifications and variations to the brake described above, all of which are contained within the scope of protection of the invention, as defined by the following claims.

The invention claimed is:

1. A brake for electric bicycle, comprising at least one mounting block including a brake lever bracket and a brake lever, further comprising an internal support-piece in turn comprising at least one first hole for housing a brake cable connected to a suitable braking apparatus and a seating portion for seating a sensor cable connecting a braking sensor to an electric motor of said electric bicycle, wherein said seating portion of said internal support-piece is a portion having a smaller diameter than the remainder of the body of said internal support-piece and in that said sensor cable is wound around said seating portion.

2. The brake for electric bicycle according to claim 1, wherein said braking sensor protrudes from a first opening in said internal support-piece and is connected to a portion of said sensor cable seated inside a suitable groove which leads into said seating portion of said internal support-piece.

3. The brake for electric bicycle according to claim 1, wherein said internal support-piece is able to be housed inside a receiving sleeve connected to a frame of said electric bicycle.

4. The brake for electric bicycle according to claim 1, wherein it further comprises a cable length adjuster associated with said internal support-piece.

5. The brake for electric bicycle according to claim 4, wherein said cable length adjuster is form coupled to a cable length adjusting screw provided with a regulating compression spring and is housed inside a first hole in said brake lever bracket, said cable length adjuster being able to displace the position of a brake sheath with respect to said brake cable.

6. The brake for electric bicycle according to claim 5, wherein said cable length adjuster comprises a knurled peripheral portion accessible on the outside of said brake lever bracket.

7. The brake for electric bicycle according to claim 1, wherein said brake lever comprises a second seat for receiving a magnet, said magnet being glued inside it.

8. A brake for electric bicycle, comprising at least one mounting block including a brake lever bracket and a brake lever, further comprising an internal support-piece in turn comprising at least one first hole for housing a brake cable connected to a suitable braking apparatus and a seating portion for seating a sensor cable connecting a braking sensor to an electric motor of said electric bicycle, wherein said brake lever comprises at least one first seat for housing a rotational bush in turn associated with a return spring kept in position by a first sliding sleeve closed by a lever pivot screw and a second sliding sleeve closed by a keyed screw, said rotational bush being the structural pin on which said brake lever rotates and having the function of a thrust bearing for said brake lever bracket.

9. The brake for electric bicycle according to claim 8, wherein said rotational bush has both its ends threaded and has a hexagonal profile in an internal central part so as to be able to fixed to said keyed screw.

* * * * *